US008753499B2

(12) United States Patent
Troshin et al.

(10) Patent No.: US 8,753,499 B2
(45) Date of Patent: Jun. 17, 2014

(54) DEIONIZATION APPARATUS AND METHOD OF CONTROLLING THE SAME

(75) Inventors: Andrey Troshin, St. Petersburg (RU); Dae Wook Park, Hwaseong-si (KR); Hideo Nojima, Seongnam-si (KR); Seon Uk Na, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1219 days.

(21) Appl. No.: 12/461,079

(22) Filed: Jul. 30, 2009

(65) Prior Publication Data

US 2010/0155261 A1 Jun. 24, 2010

(30) Foreign Application Priority Data

Dec. 22, 2008 (KR) .......................... 10-2008-131499

(51) Int. Cl.
*C02F 1/469* (2006.01)
(52) U.S. Cl.
CPC .................................. *C02F 1/4691* (2013.01)
USPC ........... 204/661; 204/554; 204/555; 204/660; 205/742; 205/743
(58) Field of Classification Search
USPC ........................................................ 205/742
See application file for complete search history.

(56) References Cited

U.S. PATENT DOCUMENTS

| 4,397,188 | A | * | 8/1983 | Bansevichus et al. | 73/651 |
| 4,569,728 | A | * | 2/1986 | Davari et al. | 205/91 |
| 5,954,937 | A | * | 9/1999 | Farmer | 205/687 |
| 6,709,560 | B2 | * | 3/2004 | Andelman et al. | 204/630 |
| 6,792,120 | B1 | * | 9/2004 | Szenics | 381/120 |
| 7,658,828 | B2 | * | 2/2010 | Freydina et al. | 204/519 |
| 7,713,421 | B2 | * | 5/2010 | Galbraith | 210/663 |
| 2003/0164308 | A1 | | 9/2003 | Schlager et al. | |
| 2005/0189220 | A1 | | 9/2005 | Yamamoto et al. | |
| 2006/0231495 | A1 | * | 10/2006 | Freydina et al. | 210/670 |
| 2008/0185294 | A1 | | 8/2008 | Cai et al. | |
| 2008/0282749 | A1 | | 11/2008 | Hahm et al. | |
| 2009/0054116 | A1 | * | 2/2009 | Hakunti et al. | 455/899 |
| 2010/0224489 | A1 | * | 9/2010 | Chapman et al. | 204/412 |

FOREIGN PATENT DOCUMENTS

| CN | 1651884 A | 8/2005 |
| CN | 101307554 A | 11/2008 |
| DE | 196 18 217 A1 | 11/1997 |
| DE | 100 15 144 A1 | 10/2001 |
| FR | 2 832 703 A1 | 5/2003 |
| JP | 10-18073 | 1/1998 |

(Continued)

OTHER PUBLICATIONS

European Search Report dated Oct. 20, 2010 in corresponding European Patent Application 09167123.0.

(Continued)

*Primary Examiner* — Keith Hendricks
*Assistant Examiner* — Salil Jain
(74) *Attorney, Agent, or Firm* — Staas & Halsey LLP

(57) ABSTRACT

A deionization apparatus for regenerating electrodes using vibration and a method of controlling the same. The deionization apparatus includes electrodes to which ions contained in a fluid are absorbed, and a piezoelectric element to separate the ions absorbed to the electrodes by vibration. Since the ions absorbed to the electrodes are separated using mechanical energy generated by the piezoelectric element, it may be possible to more rapidly perform regeneration of the electrodes.

10 Claims, 5 Drawing Sheets

(56) References Cited

FOREIGN PATENT DOCUMENTS

| JP | 2001-295087 | 10/2001 |
|----|-------------|---------|
| JP | 2005-103351 | 4/2005 |
| KR | 10-2008-0022735 | 3/2008 |
| WO | 01/90444 A1 | 11/2001 |
| WO | 2008/016671 A2 | 2/2008 |

OTHER PUBLICATIONS

Chinese Office Action for related Chinese Patent Application No. 200910163523.7, issued on Sep. 5, 2012.

* cited by examiner

DEIONIZATION APPARATUS AND METHOD OF CONTROLLING THE SAME

CROSS-REFERENCE TO RELATED APPLICATIONS

This application claims the benefit of Korean Patent Application No. 10-2008-131499, filed on Dec. 22, 2008 in the Korean Intellectual Property Office, the disclosure of which is incorporated herein by reference.

BACKGROUND

1. Field

One or more embodiments relate to a deionization apparatus to regenerate an electrode using vibration and a method of controlling the same.

2. Description of the Related Art

Water and, more particularly, subterranean water, contains large amounts of minerals such as calcium, magnesium and so on. The concentration of calcium or magnesium is called hardness, water having a high mineral concentration is called hard water, and water having a relatively low mineral concentration is called soft water.

If hard water, that is, water having high hardness, is used in electric home appliances such as a washing machine or a dish washer, the water reacts with a detergent and thus detergency is deteriorated. A large amount of scales accumulate on a channel in which the water flows, and thus product reliability is deteriorated.

Accordingly, conventionally, a soft water machine using ion exchange resin was suggested.

The soft water machine using the ion exchange resin softens water by exchanging Ca2+ and Mg2+ ions of hard water components included in water with Na+ of NaCl injected into the ion exchange resin. In the soft water machine using the ion exchange resin, NaCl is periodically injected, and the ion exchange resin is replaced with a new one due to impurities contained in the water. In addition, the method using the ion exchange resin is uneconomical, because an acidic or basic solution is used when the resin is regenerated and a large amount of polymer resin and chemicals are used in order to treat a large amount of water.

Therefore, recently, research into capacitive deionization (hereinafter, referred to as CDI) has been actively conducted.

A CDI technique is based on a simple principle that power is applied to two porous electrodes such that negative ions are electrically absorbed to a positive electrode and positive ions are electrically absorbed to a negative electrode so as to eliminate ions dissolved in a fluid such as water. In addition, when the electrodes are saturated with absorbed ions, the polarities of the electrodes are reversed or the power is turned off so as to separate (desorb) the ions absorbed to the electrodes. Therefore, the regeneration of the electrodes is simply performed. In addition, in the CDI technique, since a cleaning solution such as an acidic or basic solution is not used for the regeneration of the electrodes unlike the method using the ion exchange resin or a reverse osmosis method, secondary chemical waste is not generated and the electrodes are hardly corroded or contaminated. In addition, lifespan is semi-permanent, energy efficiency is higher than other methods, and energy consumption may be reduced 10 to 20 fold.

SUMMARY

Therefore, it is an aspect of the present invention to provide a method of eliminating ions absorbed to electrodes of a deionization apparatus using vibration.

Additional aspects and/or advantages will be set forth in part in the description which follows and, in part, will be apparent from the description, or may be learned by practice of the invention.

According to one or more embodiments, there is provided a deionization apparatus including electrodes to which ions contained in a fluid are absorbed, and a piezoelectric element to separate the ions absorbed by the electrodes by vibration.

The piezoelectric element may be a polyvinylidene fluoride (PVDF) piezoelectric plate to generate the vibration by electricity.

The electrodes may include a positive electrode and a negative electrode, and the piezoelectric element may be disposed between the positive electrode and the negative electrode.

The piezoelectric element may have a porous structure to allow passage of the fluid.

The electrodes may include a current collector and a porous carbon electrode, and the piezoelectric element may be disposed between the current collector and the porous carbon electrode.

A spacer may be filled between a porous carbon electrode of one of the electrodes, and a porous carbon electrode of another one of the electrodes.

The electrodes may include a current collector and a porous carbon electrode, and the current collector may be disposed between the piezoelectric element and the porous carbon electrode.

The deionization apparatus may further include a generator to apply a sine wave signal to the electrodes so as to generate the vibration of the piezoelectric element.

The deionization apparatus may further include a power amplifier to amplify the sine wave signal to a predetermined voltage to operate the piezoelectric element.

The deionization apparatus may further include a DC power source to apply a DC voltage to the electrodes in order to absorb the ions of the fluid, and a capacitor disposed between the DC power source and the power amplifier so as not to apply the DC voltage to the power amplifier.

According to one or more embodiments, there is provided a deionization apparatus including an ion sensor to detect an amount of ions absorbed by electrodes, and a controller to compare the amount of ions with a reference value and control the ions absorbed by the electrodes to be separated by a vibration of a piezoelectric element.

The piezoelectric element may be a polyvinylidene fluoride (PVDF) piezoelectric plate to generate the vibration by electricity.

The electrodes may include a positive electrode and a negative electrode, and the piezoelectric element may be disposed between the positive electrode and the negative electrode.

The piezoelectric element may have a porous structure to allow passage of the fluid.

The electrodes may include a current collector and a porous carbon electrode, and the piezoelectric element may be disposed between the current collector and the porous carbon electrode.

The electrodes may include a current collector and a porous carbon electrode, and the current collector may be disposed between the piezoelectric element and the porous carbon electrode.

The deionization apparatus may further include a generator to apply a sine wave signal to the electrodes so as to generate the vibration of the piezoelectric element, and a power amplifier to amplify the sine wave signal to a predetermined voltage to operate the piezoelectric element.

The deionization apparatus may further include a DC power source to apply a DC voltage to the electrodes in order to absorb the ions of the fluid, and a capacitor disposed between the DC power source and the power amplifier so as not to apply the DC voltage to the power amplifier.

According to one or more embodiments, there is provided a method of controlling a deionization apparatus, the method including detecting the amount of ions absorbed by electrodes, and separating the ions absorbed to the electrodes by the vibration of a piezoelectric element.

The separating the ions may occur upon detecting that the amount of ions is in excess of the reference value.

The separating of the ions by the vibration may include applying a sine wave signal to the electrodes such that the piezoelectric element vibrates.

The separating of the ions by the vibration may include amplifying the sine wave signal to a predetermined level and applying the amplified sine wave signal to the electrodes such that the piezoelectric element vibrates.

The separating of the ions may be by an amplifying of the sine wave signal to provide electrical impedance matching.

The separating of the ions may use ultrasonic waves.

The separated ions may be removed from a deionization apparatus by fluid moving between the electrodes.

According to one or more embodiments, since the ions absorbed to the electrodes are desorbed using the ultrasonic wave, it may be possible to more rapidly perform the regeneration of the deionization apparatus.

According to one or more embodiments, since an expensive membrane is not required for the regeneration of the deionization apparatus, cost may be reduced.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
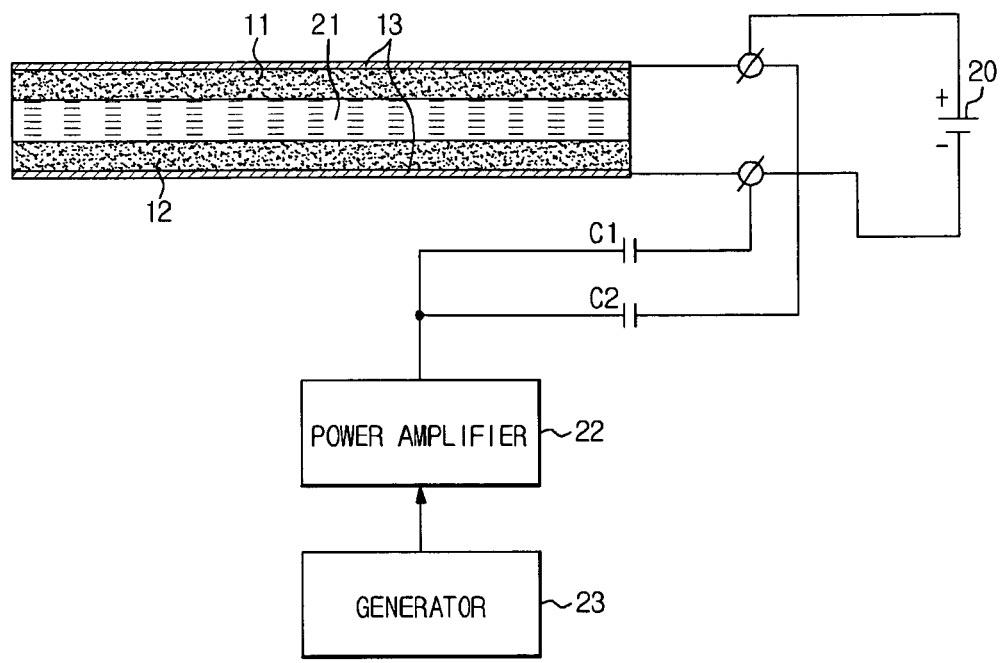
FIG. 1 is a schematic view showing the configuration of a deionization apparatus according to an embodiment of the present invention.

Reference will now be made in detail to one or more embodiments, examples of which are illustrated in the accompanying drawings, wherein like reference numerals refer to the like elements throughout. Example embodiments are described below to explain one or more embodiments of the present invention by referring to the figures.

FIG. 1 is a schematic view showing the configuration of a deionization apparatus according to one or more embodiments.

As shown in FIG. 1, the deionization apparatus according to one or more embodiments may include current collectors 13 to which power is applied, electrodes 11 and 12 formed of porous carbon, a DC power source 20 to apply a voltage having a predetermined level to the electrodes 11 and 12, a piezoelectric element 21 disposed between the positive electrode 11 and the negative electrode 12 of the carbon electrodes 11 and 12 to generate vibration, a generator 23 to apply a sine wave signal in a predetermined range to the current collectors 13, a power amplifier 22 to amplify the sine wave signal applied by the generator 23, and a plurality of capacitors C1 and C2 disposed between the DC power source 20 and the power amplifier 22 in order to prevent the DC voltage from being applied to the power amplifier 22.

The current collectors 13 may be formed of conductive rubber or a metal foam material such as nickel (Ni), aluminum (Al) or titanium (Ti). Capacitor electrodes 11 and 12, may be manufactured by pressing porous carbon using a high-pressure press. In addition, a potential difference may be generated between the positive electrode 11 and the negative electrode 12 of the capacitor electrodes, by applying power to the current collectors 13.

The electrodes 11 and 12 formed of the porous carbon may be manufactured using a monolithic carbon aerogel composite (CAC) electrode material manufactured by sol-gel polymerization of resorcinol and formaldehyde. In addition, the gaps of the porous carbon electrodes 11 and 12 do not have a micropore form, but have a mesopore form such that ions are rapidly penetrated and spread. In addition, an electrolyzer to improve the durability of the porous carbon electrodes 11 and 12 may be manufactured, and the durability may be improved by utilizing the carbon electrodes together with the current collectors.

The DC power 20 applies a voltage having a predetermined level to the current collectors 13 so as to generate a potential difference between the electrodes 11 and 12. Meanwhile, the level of the DC voltage applied to the electrodes 11 and 12 has an influence on the ion mass transfer of a fluid. As the voltage is increased, the ion mass transfer is increased, and, as the voltage is decreased, the ion mass transfer is decreased. Accordingly, the DC voltage is adjusted in order to adjust the properties of the treated fluid. For example, a DC voltage having a voltage level which is generally selectable in a range from about 0V to 330 V or in a range from 30 V to 300 V is generated.

Meanwhile, when the DC power source 20 supplies power to the current collectors 13 of the capacitor electrodes of the deionization apparatus according to one or more embodiments, negative ions are electrically absorbed to the positive electrode 11 and positive ions are electrically absorbed to the negative electrode 12, thereby eliminating the ions from the fluid (liquid and gas).

That is, an electrolyte (seawater or waste water) having various negative ions and positive ions passes between the two positive and negative electrodes 11 and 12 using a porous Activated Carbon Powder (ACP) sheet having a high specific surface area and electric double layer capacitor characteristics, a monolithic CAC sheet or a conductive polymer having pseudo capacitor characteristics and metal oxide or a composite material thereof as an electrode material, ionic impurities, that is, non-oxidation/reduction organic or inorganic negative and positive ions, such as OH—, Cl—, F—, and HCO3— and Li+, Na+, and K+, are eliminated by a difference between the voltages applied to the two electrode sheets of about 0.6 to 1.2 V, and reduced positive ions such as $Cu^{2+}$, $Fe^{2+}$, $Pb^{2+}$, and $Cd^{2+}$ are separated from the electrolyte so as to be ionically absorbed to the surfaces of the fine pores of the porous carbon electrodes of the two electrochemical capacitor electrodes 11 and 12 by an electric double layer or to be charged by oxidation/reduction reaction, such that the seawater or waste water is desalinated while the concentration of the ionic impurities in the electrolyte flow is gradually decreased. Meanwhile, conventionally, a method of simply eliminating an electric field of the two electrodes 11 and 12 saturated with ionic impurities or desorbing ions saturated and absorbed to the surfaces of the fine pores of the two porous carbon electrodes by a reverse potential difference of −0.6 to −1.2 V so as to be transferred into the electrolyte and to be discharged was used. In addition, by the above-described behavior, organic/inorganic ions or dipole materials are simultaneously separated and eliminated from the seawater or the waste water which is the conductive solvent other than water.

The piezoelectric element 21 generates mechanical force when electricity is applied thereto. According to one or more embodiments, since a film has a small thickness and a porous structure, a polyvinylidene fluoride (PVDF) piezoelectric plate which allows a fluid to pass between the two carbon electrodes 11 and 12 may be used as the piezoelectric element 21.

Meanwhile, the PVDF piezoelectric plate is formed of polyvinylidene fluoride and may be disposed between the positive electrode 11 and the negative electrode 12 of the carbon electrodes 11 and 12.

In addition, when a sine wave signal is applied to the carbon electrodes 11 and 12, the PVDF piezoelectric plate 21 vibrates due to a piezoelectric effect. The vibration is supplied to the carbon electrodes 11 and 12 via the fluid in the ultrasonic form. That is, the PVDF piezoelectric plate 21 generates an ultrasonic wave as an ultrasonic actuator.

Meanwhile, the PVDF piezoelectric plate 21 may be formed of a porous material, which is described in detail in U.S. Pat. No. 6,146,747.

The generator 23 applies a sine wave signal having a predetermined frequency to the current collectors 13. In detail, when a regeneration operation of the deionization apparatus is started, the generator 23 applies a sine wave signal having a frequency of 20 kHz to 40 kHz and an effective value of 10 V to the current collectors 13, which are conditions to generate an ultrasonic wave having adequate intensity of about 0.5 watt/m2 by the PVDF piezoelectric plate 21. The conditions may be changed according to the deionization apparatus.

The power amplifier 22 amplifies the amplitude of the sine wave signal applied by the generator 23. In other words, the amplitude of the sine wave signal generated by the generator 23 and having the frequency of 20 kHz to 40 kHz and the effective value of 10 V is increased so as to provide electrical impedance matching.

The capacitors C1 and C2 are disposed between the DC power 20 and the power amplifier 22 such that a DC voltage is not applied to the generator 23 and the power amplifier 22.

Figure 2:
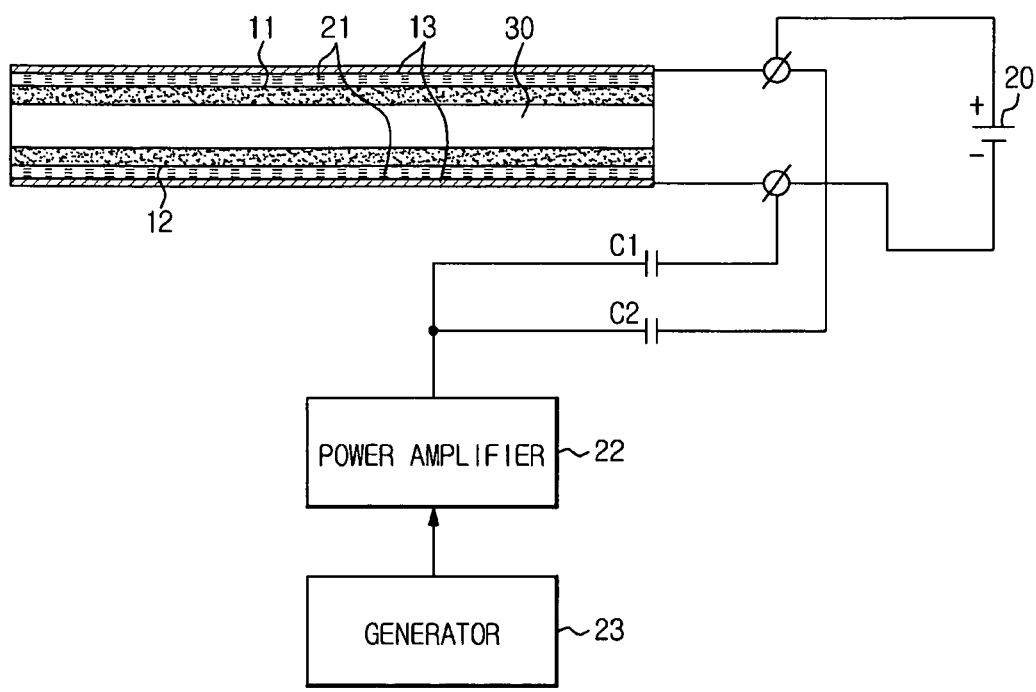
FIG. 2 is a schematic view showing the configuration of a deionization apparatus according to an embodiment of the present invention.

FIG. 2 is a schematic view showing the configuration of a deionization apparatus according to one or more embodiments. The same portions as FIG. 1 will be denoted by the same reference numerals.

As shown in FIG. 2, the deionization apparatus according to one or more embodiments includes current collectors 13 to which power is applied, porous carbon electrodes 11 and 12, a DC power source 20 to apply a voltage having a predetermined level to the electrodes, a piezoelectric element 21 disposed between the positive electrode 11 and the negative electrode 12 of the carbon electrodes 11 and 12 to generate vibration, a generator 23 to apply a sine wave signal in a predetermined range to the current collectors 13, a power amplifier 22 to amplify the sine wave signal applied by the generator 23, and a plurality of capacitors C1 and C2 disposed between the DC power source 20 and the power amplifier 22 in order to prevent the DC voltage from being applied to the power amplifier 22.

The configuration of FIG. 2 is different from that of FIG. 1 in a position where the piezoelectric element 21 is disposed. That is, the PVDF piezoelectric plate which may be used as the piezoelectric element 21 is disposed between the current collectors 13 and the carbon electrodes 11 and 12 so as to desorb the ions absorbed to the carbon electrodes 11 and 12. In detail, when a sine wave signal is applied to the current collectors 13, the piezoelectric element 21 disposed between the current collectors 13 and the carbon electrodes 11 and 12, that is, the PVDF piezoelectric plate, generates mechanical vibration. Such vibration directly travels to the carbon electrodes 11 and 12 so as to separate the ions.

Meanwhile, a spacer 30 having an average gap or opening having a diameter of about 10 μm or more may be filled between the positive electrode 11 and the negative electrode 12, in order to provide uniform fluid flow.

Figure 3:
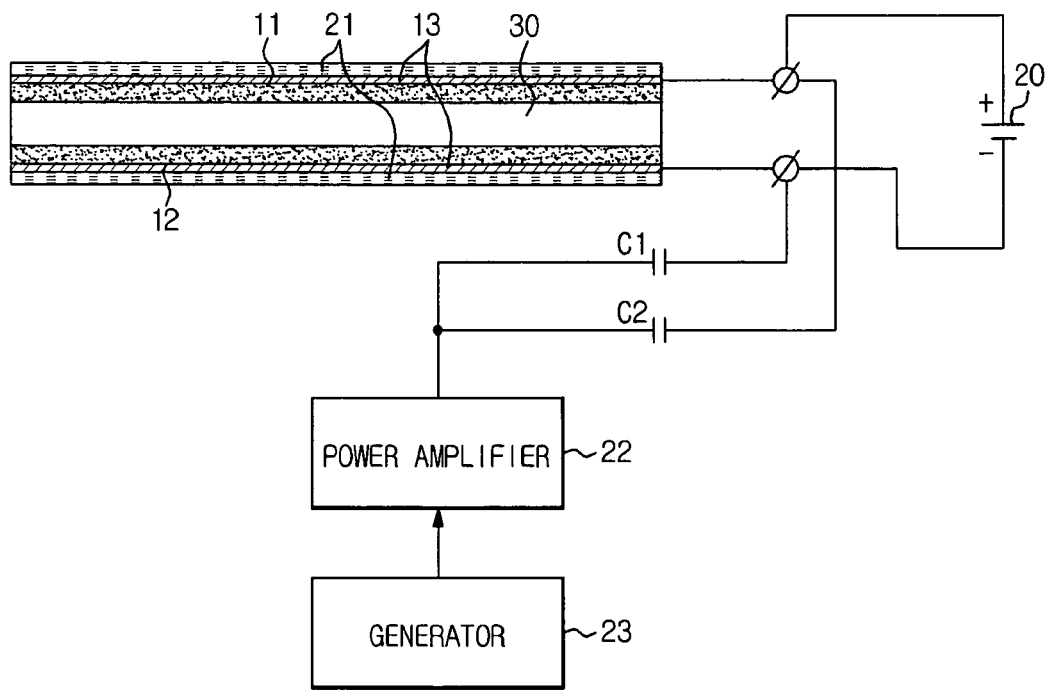
FIG. 3 is a schematic view showing the configuration of a deionization apparatus according to an embodiment of the present invention.

FIG. 3 is a schematic view showing the configuration of a deionization apparatus according to one or more embodiments. The same portions as FIG. 1 or FIG. 2 will be denoted by the same reference numerals.

The configuration of FIG. 3 is different from those of FIGS. 1 and 2 in a position where the piezoelectric element 21 is disposed. That is, the PVDF piezoelectric plate which may be used as the piezoelectric element 21 is provided on each of the outer surfaces of the electrodes 11 and 12, that is, each of the outer surfaces of the current collectors 13, so as to desorb the ions absorbed to the carbon electrodes 11 and 12. In detail, when a sine wave signal is applied to the current collectors 13, the piezoelectric element 21 provided on each of the outer surfaces of the current collectors 13, that is, the PVDF piezoelectric plate, generates mechanical vibration. Such vibration travels to the carbon electrodes 11 and 12 via the current collectors 13 so as to separate the ions.

Figure 4:
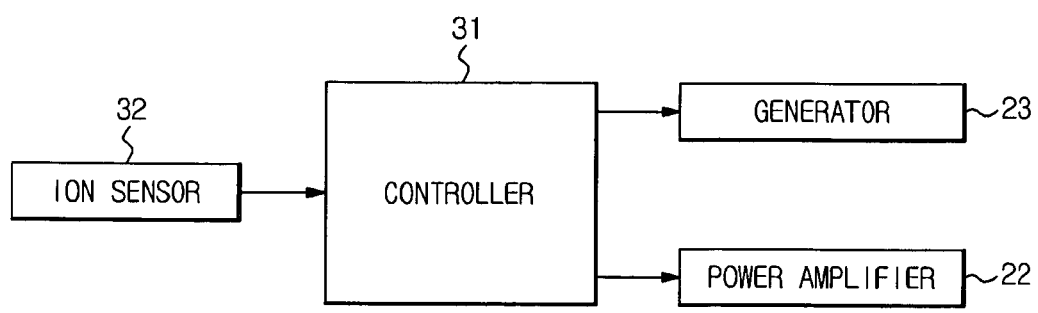
FIG. 4 is a control block diagram of a deionization apparatus according to an embodiment of the present invention.

FIG. 4 is a control block diagram of a deionization apparatus according to one or more embodiments.

As shown in FIG. 4, the deionization apparatus according to one or more embodiments includes an ion sensor 32 to sense the amount of ions which are present in a fluid, a generator 23 to apply a sine wave signal to the current collectors 13, and a power amplifier 22 to amplify the sine wave signal applied by the generator 23.

The ion sensor 32 senses the amount of ions absorbed to the electrodes 11 and 12 (FIGS. 1, 2, and 3) of the deionization apparatus and transmits information on the amount of ions to a controller 31.

The generator 23 applies a sine wave signal having a predetermined frequency to the current collectors 13 (FIGS. 1, 2, and 3). In detail, the generator 23 may apply a sine wave signal having a frequency of 20 kHz to about 40 kHz and an effective value of 10 V to the current collectors 13 (FIGS. 1, 2, and 3), which are conditions to generate an ultrasonic wave having adequate intensity of about 0.5 watt/m2 in the PVDF piezoelectric plate of the piezoelectric element of an embodiment of the present invention.

The power amplifier 22 amplifies the sine wave signal applied to the generator 23. In other words, the amplitude of the sine wave signal generated by the generator 23 and having the frequency of 20 kHz to 40 kHz and the effective value of 10 V is increased so as to provide electrical impedance matching.

When the ions of the fluid are controlled to be absorbed in the deionization apparatus, the controller 31 controls a signal to be transmitted to the DC power source 20 (FIGS. 1, 2, and 3) such that the voltage having the predetermined level is applied to the current collectors 13 (FIGS. 1, 2, and 3), and controls a potential difference to be generated between the positive electrode and the negative electrode of the carbon electrodes 11 and 12 (FIGS. 1, 2, and 3), thereby controlling the ions of the fluid to be absorbed.

Meanwhile, the controller 31 compares the amount of ions transmitted from the ion sensor 32 with a reference value and begins regeneration of the deionization apparatus if the amount of ions of the fluid is greater than the reference value. That is, in order to eliminate the ions absorbed to the carbon electrodes 11 and 12 (FIGS. 1, 2, and 3), the signal is transmitted such that the generator 23 applies a sine wave signal having the predetermined frequency and the effective value, and a sine wave amplification signal is transmitted to the power amplifier 22 such that sufficient mechanical energy is emitted from the piezoelectric element 21 (FIGS. 1, 2, and 3).

Meanwhile, the method of starting the operation to separate the ions with which the electrodes of the deionization apparatus are saturated is not limited to the above-described method. Various methods including a method of deciding a regeneration start operation using a current sensor or starting an ion separating operation in a predetermined period may be used.

Figure 5:
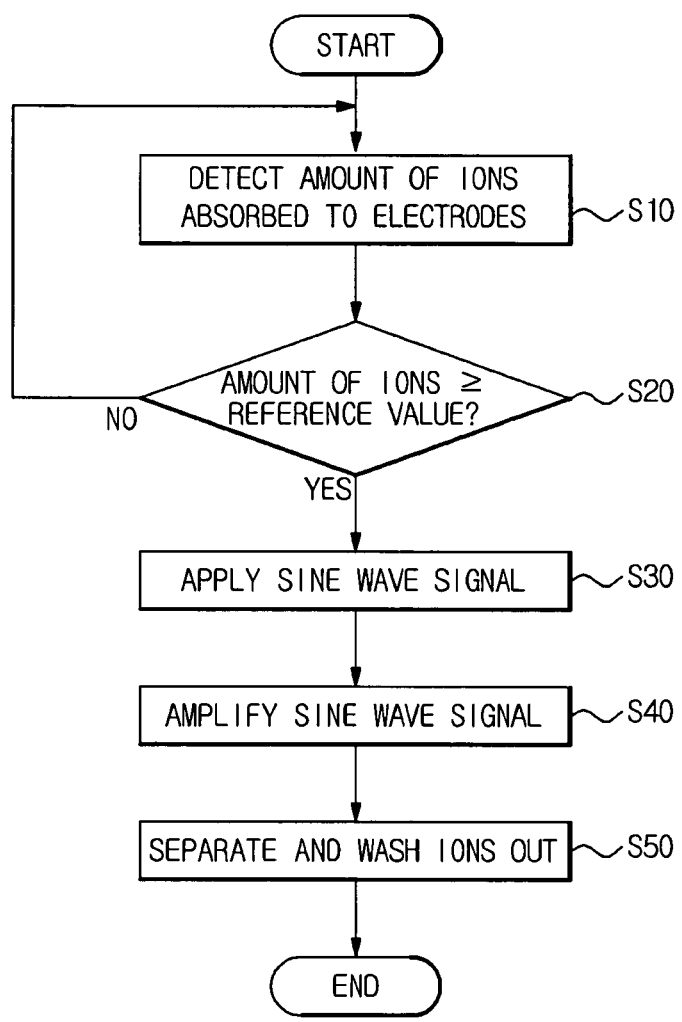
FIG. 5 is a flowchart illustrating a method of controlling a deionization apparatus according to an embodiment of the present invention.

FIG. 5 is a flowchart illustrating a method of controlling a deionization apparatus according to one or more embodiments.

As shown in FIGS. 1-5, when the operation of the deionization apparatus is started, the ion sensor 32 senses the amount of ions absorbed to the electrodes of the deionization apparatus.

In detail, the fluid passes between the carbon electrodes 11 and 12 such that ionic impurities, that is, non-oxidation/reduction organic or inorganic negative ions and positive ions, such as OH—, Cl—, F—, and HCO3— and Li+, Na+, and K+, are eliminated and reduced positive ions such as $Cu^{2+}$, $Fe^{2+}$, $Pb^{2+}$, and $Cd^{2+}$ are separated from the electrolyte so as to be ionically absorbed to the surfaces of the fine pores of the porous carbon electrodes of the two electrochemical capacitor electrodes 11 and 12 by the electric double layer. At this time, in operation S10, the amount of ions absorbed to the electrodes 11 and 12 is sensed and information about the amount of ions is transmitted to the controller 31.

Next, in operation S20, the controller 31 compares the sensed amount of ions with the reference value. With respect to the amount of ions absorbed to the electrodes, the reference value is arbitrarily determined by a designer as necessary and may be changed according to the use of the deionization apparatus. If is it determined that the sensed amount of ions is greater than or equal to the reference value, the method advances to operation S30. If it is determined that the sensed amount of ions is not greater than or equal to the reference value, the method returns to operation S10.

Next, in operation S30, the generator 23 applies the sine wave signal to the electrodes 11 and 12. That is, when the regeneration operation of the deionization apparatus is started, the generator 23 may apply the sine wave signal having the frequency of 20 kHz to 40 kHz and the effective value of 10 V to the current collectors 13.

Next, in operation S40, the power amplifier 22 amplifies the sine wave signal applied by the generator 23 and applies the amplified sine wave signal to the electrodes 11 and 12. In other words, the power amplifier 22 amplifies the sine wave signal output from the generator 23 to a predetermined voltage to generate sufficient mechanical energy to provide electrical impedance matching.

Next, in operation S50, when the sine wave signal is applied to the electrodes 11 and 12, the piezoelectric element 21 generates mechanical energy by a piezoelectric effect. The mechanical energy generates the ultrasonic wave via the fluid, and the ultrasonic wave is supplied to the electrodes so as to separate the ions. That is, the piezoelectric element 21, which may be the PVDF piezoelectric plate 21, generates the ultrasonic wave as the ultrasonic actuator. Meanwhile, in an arrangement where the piezoelectric element 21 is provided between the carbon electrodes 11 and 12 and the current collectors 13 or is provided outside the current collectors 13, the mechanical energy of the piezoelectric element 21 directly travels to the carbon electrodes 11 and 12 so as to separate the ions. The ions separated by the above-described method are washed out by the fluid which moves between the carbon electrodes 11 and 12.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A deionization apparatus comprising:
    porous carbon electrodes to which ions contained in a fluid are absorbed;
    current collectors to which power is applied;
    a piezoelectric element to separate the ions absorbed by the porous carbon electrodes by vibration; and
    a controller to control ions of the fluid to be absorbed in the porous carbon electrodes and control the ions absorbed by the porous carbon electrodes to be separated by a vibration of the piezoelectric element,
    wherein the current collectors receive a direct current (DC) voltage to power the porous carbon electrodes and a sine wave signal to power the piezoelectric element.

2. The deionization apparatus according to claim 1, wherein the piezoelectric element is a polyvinylidene fluoride (PVDF) piezoelectric plate to generate the vibration.

3. The deionization apparatus according to claim 1, wherein the porous carbon electrodes include a positive electrode and a negative electrode, and the piezoelectric element is disposed between the positive electrode and the negative electrode.

4. The deionization apparatus according to claim 3, wherein the piezoelectric element has a porous structure to allow passage of the fluid.

5. The deionization apparatus according to claim 1, wherein the piezoelectric element is disposed between one of the current collectors and the corresponding porous carbon electrode.

6. The deionization apparatus according to claim 5, wherein a spacer is filled between one of the porous carbon electrodes, and another one of the porous carbon electrodes.

7. The deionization apparatus according to claim 1, wherein one of the current collectors is disposed between the piezoelectric element and one of the porous carbon electrodes.

8. The deionization apparatus according to claim 1, further comprising a generator to apply the sine wave signal to the current collectors so as to generate the vibration of the piezoelectric element.

9. The deionization apparatus according to claim 8, further comprising a power amplifier to amplify the sine wave signal to a predetermined voltage to operate the piezoelectric element.

10. The deionization apparatus according to claim 9, further comprising:
    a DC power source to apply the DC voltage to the current collectors; and a capacitor disposed between the DC power source and the power amplifier so as not to apply the DC voltage to the power amplifier.

\* \* \* \* \*